United States Patent Office 3,763,056
Patented Oct. 2, 1973

3,763,056
POROUS POLYMERIC COMPOSITIONS,
PROCESSES AND PRODUCTS
Gunther Will, 10–12 Zimmerstr.,
61 Darmstadt, Germany
Continuation-in-part of abandoned applications Ser. No.
874,024 and Ser. No. 874,044, both Nov. 4, 1969. This
application June 2, 1971, Ser. No. 149,317
Int. Cl. C08f 47/08, 47/18
U.S. Cl. 260—2.5 L                                29 Claims

ABSTRACT OF THE DISCLOSURE

Various shaped products; methods of making shaped thermoset water-in-oil emulsions with polymerizable monomer, water-in-oil emulsifier, water-soluble wetting agent (in an amount less than that required to break the emulsion) and pulverulent solid polymer which is distributed throughout the emulsion and which is at least swellable in the oil phase; and processes for producing ceramic articles.

RELATED APPLICATIONS

Figure 1:
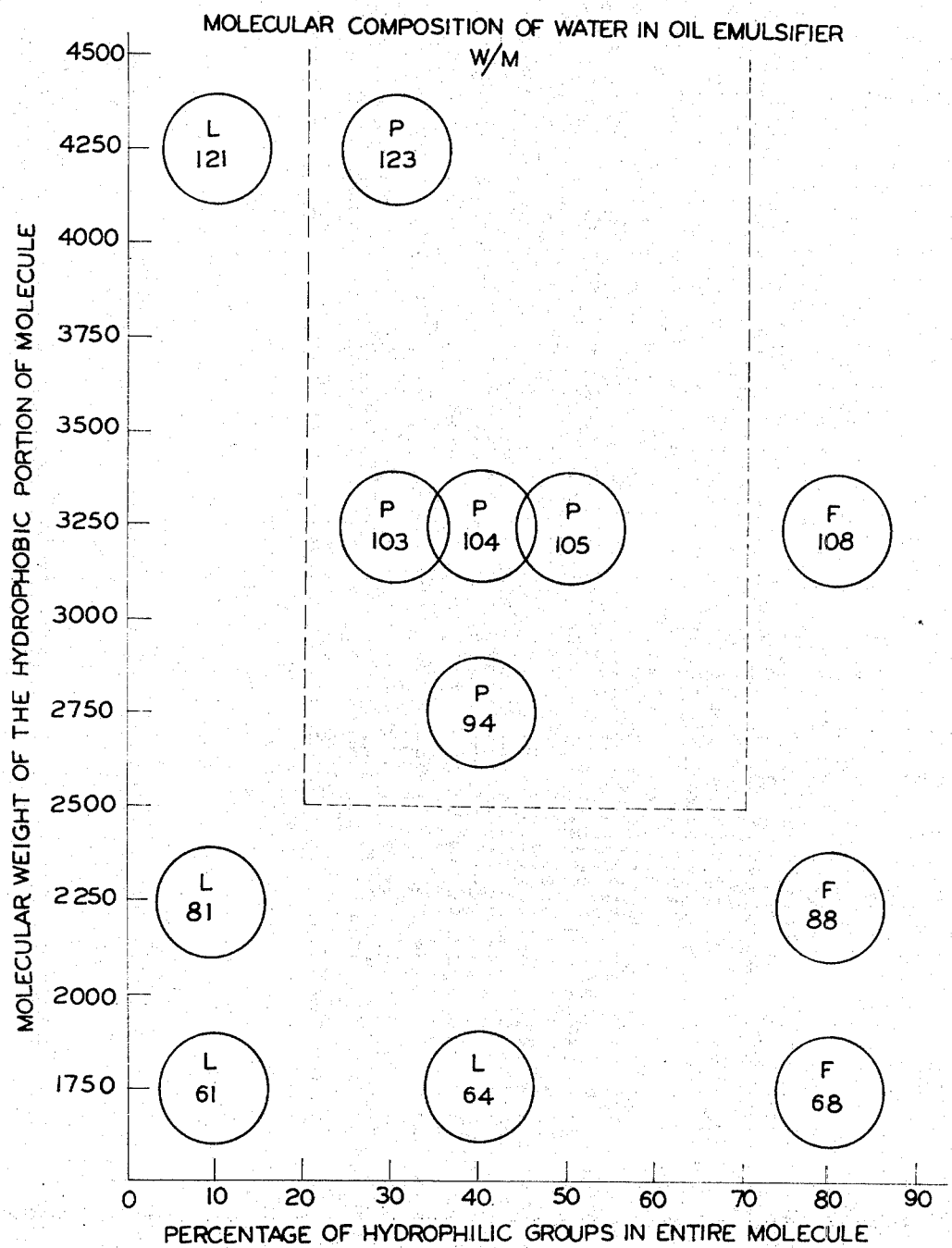

This is a continuation-in-part of my prior copending applications Ser. Nos. 874,024 and 874,044, both filed Nov. 4, 1969, and now abandoned.

INTRODUCTION

The prior art discloses various polymerization processes involving distribution of water in a liquid monomer. The monomer is polymerized while the water, which takes little or no part in the polymerization, is retained in the polymerizing mixture, sometimes as fine droplets and sometimes as larger globules. When the monomer has been converted to solid form by the polymerization, it constitutes a solid matrix throughout which are distributed voids, known as cells, which are filled with and correspond in shape to the water droplets or globules.

At an early stage in the development of this art, it was recognized that retention of the water in the polymerizing mixture in a dispersed condition was a problem. Thus, it was proposed first by Hazell and later by Fisk in U.S. Pats. 2,112,529 and 2,505,323 respectively, that the water be held in place by adsorption upon an inorganic solid adsorbent such as silica gel which was distributed throughout the mixture to convert it to a paste. Although Fisk experimented with mixtures which contained no silica gel, he characterized the results as unsuccessful, and it appeared quite clear that the solid adsorbent was essential.

Prior to issuance of Fisk's patent, it was already known that water-in-oil emulsions could be prepared with the aid of polymeric emulsifiers, such as polyester resins. However, it seemed inevitable through the teachings of Kropa, U.S. Pat. 2,443,735, that water-in-oil emulsions based upon polymeric emulsifiers would break when subjected to polymerizing conditions. This may explain—in retrospect—why the technique of forming porous plastic products from water-in-oil emulsions was not obvious to those skilled in the art. Indeed, the teachings of Kropa clearly led away from such technique.

In an article on a distinctly different type of polymerization process (Uber den Mechanismus der dreiphasigen Emulgierung bei der Perlpolymerization, Makromolecular Chemie, vol. 20, pp. 196–213, 1956) Wenning incidentally disclosed polymerization of a water-in-oil emulsion supported by inorganic, water- and oil-insoluble barium sulfate particles coated with double layers of non-polymeric emulsifier. The insoluble solid particles of barium sulfate attracted the hydrophilic groups in the first layer of emulsifier molecules, and this in turn caused the hydrophilic groups in the second layer to turn outwards. Because Wenning's emulsification system was so unlike that of Kropa, Wenning in no way reduced the force of Kropa's teachings that water-in-oil emulsions based on polymeric emulsifiers would break on polymerization. Indeed, Wenning tended to reinforce Fisk's teaching of the necessity of using an inorganic solid adsorbent (for the water or the emulsifier).

Even when Belgian Pats. 558,970 and 565,530 and corresponding U.S. Pat. 3,027,336 issued to Franz Gotz, Helmut Will and the present inventor, they did not disclose the idea of sustaining a water-in-oil emulsion containing minute water droplets until polymerization had solidified the surrounding monomeric phase. The teachings of those patents suggested preparing a paste in which the weight percentage of solids substantially exceeded that of the liquids and then polymerizing under conditions which drove the bulk of the water out of the pasty mixture so that even if a water-in-oil emulsion could have formed, it would have broken prior to solidification.

Thereafter, the present inventor discovered and described in U.S. Pat. 3,256,219 a method of producing porous products having very small pore sizes, e.g. 50μ or less, by maintaining a water-in-oil emulsion during polymerization until the resultant solidification of the oil phase had essentially immobilized the water. Thus, the voids in the resultant resinous matrix essentially corresponded to the extremely small dimensions which characterized the water droplets in the emulsion. Moreover, it was shown that contrary to the teachings of the prior art, this could be done with polymeric emulsifiers.

The aforementioned patent describes the production of porous products in which the extent of intercommunication between cells varies. As between such products, the ease of removing the water after the polymerization varies. Further experimentation and commercial experience with these products has shown that those with predominantly open cells have definite advantages for certain applications but are the most difficult to produce in a reproducible manner. Thus, for instance, it was discovered that open-celled products were useful in making quick-drying molded products and had potential as filter media, but a way had to be found to dependably produce products with more than 40 or 50% of open cells while at the same time obtaining reproducible permeability. Heretofore, the production of filter media of reproducible permeability seemed to be possible only by sintering finely divided solids, such as glass, metal, porcelain or ceramic materials and plastics such as polystyrene and polyethylene.

Accordingly, a need existed for techniques for particularly promoting the formation of products characterized by increased intercommunication between cells. Also, when manufacturing products for filtering and related applications, there was a need for improvements in the reproducibility of the permeability of such products. The present invention is believed to satisfy the foregoing needs.

Heretofore, when making products with open cells, it was found that a certain phase transition occurred during polymerization. As was pointed out in U.S. Pat. 3,256,219, this phase transition could be promoted by the addition of acidic substances. However, when using large amounts of acid in an attempt to produce a high percentage of open cells, the phenomenon proved difficult to control, occasionally resulting in the formation of pulverulent to finely grained polymer similar to that described by Kropa in U.S. Pat. 2,443,801, or the solid, sponge-like resinous products having mostly relatively large cavities readily observable with the naked eye. These sponge-like products are not to be confused with the microporous products of the present invention.

BRIEF SUMMARY OF THE PRESENT INVENTION

It has now been found that product of products having open cells is facilitated and more effectively controlled through the use of a water-in-oil emulsion containing the following components:

(W) water, in an amounst hereinafter identified as $w$, which is in the range of about 20 to about 60 parts;

(P) water insoluble pulverulent solid polymers(s) (including copolymers) that is at least swellable in M, below, and is present in an amount hereinafter referred to as $p$, which amount is in the range of about $$\frac{100-w}{x},$$

to about $$\frac{100-w}{1.8}$$

parts wherein $x$ is 10, or more preferably, for certain applications, is 5;

(M) $100-(w+p)$ parts of oil phase, organic liquid immiscible with water, including at least one polymerizable liquid monomer that has a terminal $CH_2=C<$ group and is present in the oil phase in sufficient amount for, on polymerization, converting the system to solid form;

(W/M) water-in-oil emulsifier(s) which is at least soluble in M and may be soluble in water and is present in the composition in an amount which is at least initially effective to sustain W, P and M in a water-in-oil emulsion having the property of resistance against breaking in response to the placement of said composition on a forming member;

(W/A) wetting agent(s) which is soluble in water and present in the composition in an amount which is insufficient to break a water-in-oil emulsion, as initially formed of W, P, M and W/M supra, the basis for W, P and M being the combined weight of W, P and M in the composition.

In the practice of the invention, a mixture containing the ingredients described above is emulsified by agitation. In the resultant water-in-oil emulsion, a general balance exists among the forces of attraction and repulsion which the aqueous phase and the oil phase (containing the monomer) exert upon themselves and each other. This balance tends to prevent coalescing of the emulsified water droplets and thus discourages breaking of the emulsion.

The theory which best explains the operation of the invention rests on the observation that the pulverulent polymer P introduces a condition of imbalance into the system. As the polymer swells or dissolves, it withdraws into itself some of the oil phase. The portion of the oil phase which thus becomes trapped in swollen polymer particles or viscous pockets of dissolved polymer is no longer able to balance the forces in the aqueous phase to the same extent as when the emulsion was first formed. Wetting agent(s) have heretofore been regarded by Fisk and Kropa as having an inherent tendency to break the emulsions. But in the present case they are used in a quantity which is insufficient to break the emulsion which is originally formed. Nevertheless, the gradual monomer-withdrawing action of the pulverulent polymer, with the cooperation of the limited quantity of wetting agent which is present, renders the system increasingly unstable. Because of the particular quantity relationship (controlled by the above formula) which exists between the water, pulverulent polymer and oil phase, the same oil-phase withdrawing action which induces imbalance between the aforesaid attractive and repulsive forces simultaneously increases the viscosity of the system. Thus, by the time the oil phase has been withdrawn sufficiently to encourage substantial coalescence of the water droplets, the viscosity of the system has increased to the point where only very short-range movement of the water droplets is possible. Thus, "breaking," i.e. visible decomposition, of the emulsion is no longer possible. Although the approximate state of distribution in which the water existed in the water-in-oil emulsion prior to swelling of polymer P is thereafter generally preserved, adjacent water droplets are apparently pushed and/or drawn closer together and in some cases even caused to coalesce. Upon solidification of the mass in the foregoing condition, the resultant product has far more open cells than have heretofore been obtained when the polymer P, wetting agent W/A or both were omitted.

Apparently, the majority of the cells in solid products produced from the compositions of the present invention actually have openings in their walls or have such a thin common wall with an adjoining cell that upon application of one or more of the normal techniques of water removal, e.g., drying by exposing to the air, heating, vacuum, mechanical or fluid pressure and others, the common wall will rupture to provide for the flow of fluids between the cells. The cells may be of any shape, including irregular, generally spherical and ellipsoidal. If the system is manipulated to produce or approach the production of two continuous phases, the "cells" may possibly have a shape which is more aptly described as generally tubular. In any event, the droplets of water which were present in the system prior to polymerization in the extremely minute sizes which characterize water droplets in a water-in-oil emulsion are caused to approach one another, and prior to and during polymerization, the breaking of the emulsion is prevented until the reaction mass has been solidified to the extent that redistribution of the water will no longer occur.

The procedure just described requires mixing of the ingredients to form the water-in-oil emulsion, and permits the normal mechanical shocks and mixing involved in transporting the mixture to the mold and filling the latter. However, the mixture should be "at rest" (meaning there should be no mixing) during the period of instability and solidification of the mixture.

The compositions of the invention may be prepared by mixing the components all at once or in sequence. Pulverulent solid polymer component P is preferably combined with the other ingredients while suspended in water without—or more preferably with—the aid of the wetting agent W/A. However, the process of combining the components W, P, M, W/M and W/A in any order is considered to be part of the present invention.

The present invention makes available resinous products of a novel and non-obvious character. Specifically, it appears that for the first time the present invention has made available a porous resin matrix substantially free of solid water adsorbents within the pores and having a permeability of less than about 2700 and preferably less than 50 seconds as determined by the permeability test described hereinafter. Moreover, resinous matrices having predominantly intercommunicating cells, the major portion of which cells have a maximum cross-sectional dimension of less than about $50\mu$ and more than 40% or preferably more than 55% of the combined pore volume of which is free of water (and therefore "open") are also believed to be novel and non-obvious. For purposes of this invention, the combined pore volume is defined as the total volume of water employed in forming the pores (assuming non-evaporative polymerization conditions and no consumption of water in the polymerization). The percent volume which is free of water is 100 times the volume of water which has been removed from the solidified product divided by the combined pore volume.

EXAMPLES OF MATERIALS USEFUL IN PRACTICING THE INVENTION

Component W

The term "water" as employed herein includes water per se, and liquid aqueous media which contain at least 25% of water and any other desired ingredients which are non-deleterious in respect to the creation and maintenance of the water-in-oil emulsion and the polymerization of the monomer component M. Nonlimiting classes of such other ingredients include salts, solvents and colorants and mixtures thereof. Examples include: alcohols, in particular lower monohydric aliphatic alcohols with one to about six carbon atoms such as methanol ethanol, isopropanol and n-, iso- and tertiary-butanol; lower organic acids containing one to about six carbon atoms, such as acetic acid and propionic acid; lower ethers and ketones with one to about six carbon atoms, including methyl ethyl ether and dimethyl ketone; water soluble inorganic salts such as sodium chloride, potassium sulfate, sodium sulfate, magnesium sulfate and magnesium chloride; organic liquids with high dielectric constant like formamide, dimethylformamide, saccharose, glucose, fructose, or other carbohydrates in aqueous solution. At present, the best results have been obtained with water per se.

Component P

The principal purpose of the solid pulverulent polymer component P in the mixtures of the present invention is the thickening of the water-in-oil emulsion after it is prepared and prior to or during polymerization. Thus, the swellability of the solid polymer in the oil phase or monomer M rather than the particular type of polymer backbone and functional groups therein is the principal basis for selection thereof. Provided it is supplied to the mixture in solid form, component P may carry out its intended function even if it eventually dissolves in the oil phase, if such dissolution occurs slowly enough so that there is some swelling of the polymer in the solid form after formation of the emulsion and the emulsion remains "at rest" (no mixing) after dissolution of P and until polymerization has effected solidification of the mass. The solid polymer need not dissolve, however, if it swells appreciably in the monomer prior to the time when the advancement of polymerization has substantially foreclosed re-distribution of the water in the mixture.

The optimum way of practicing the invention for making molded objects is to employ a polymer P which, when dispersed in the water W with the oil-in-water emulsifier W/M will swell slowly enough to delay the major portion of the resultant increase in the viscosity of the mixture until the latter has been shaped, but will nevertheless swell appreciably in the time provided between shaping and solidification of the mixture, and will not dissolve during such time period. An illustrative and by no means exhaustive listing of the types of polymers which may be obtained in a form satisfying the foregoing recommendations includes homopolymers and copolymers of acrylates, methacrylates, styrene, vinyl acetate, vinyl chloride, diallyl phthalate or acrylonitrile. Precondensates of unsaturated polyesters as well as copolymers of styrene and methacrylates may be used. Polymethylmethacrylate is a preferred polymer, especially homo- and copolymers containing at least 90% of polymerized methyl methacrylate. Mixtures including about 10 to 90% and preferably about 25 to 75% by weight of vinyl chloride polymer impart a wide range of costs and physical properties to the final product. Substantial cost savings with a negligible to moderate penalty in physical properties, as compared to the use of only an acrylate (e.g. polymethylmethacrylate), may be achieved through the use of mixtures which wholly or predominantly include acrylate and vinyl chloride polymers in relative weight percentages of about 35±5% and about 65±5% respectively. See, for instance, Example 17, below. Generally, however, any water-insoluble polymer may be used if it is at least swellable in the oil phase or monomer.

A valuable screening test for selecting preferred polymers may be conducted by mixing particles of the polymer P with the oil phase or monomer M in equal parts by weight and stirring steadily. If after five and more preferably eight minutes a small drop of the mixture is allowed to drip from the stirring implement, and no strings or filaments form, the mixture may be regarded as still liquid and the polymer has passed the test. Polymers which alone will not pass the test may be used with very good results when mixed with those which do. For example, readily soluble polystyrene may be used in admixture with relatively insoluble polyvinyl chloride. The temperature chosen for the test is in or quite close to the temperature range in which the compositions of the invention will be prepared and shaped, e.g. 20° C.

Component M

All known polymerizable water-immiscible ethylenically unsaturated monomers which are polymerizable to water-insoluble polymers in the form of water-in-oil emulsions are useable in the present invention. Those which have a single terminal $CH_2=C<$ group and have a solubility in water not exceeding about 10 percent by weight are preferred. For example, the following types of compounds may be employed:

(1) Aromatic monovinyl hydrocarbons (such as styrene) as well as styrenes alkylated in the side chain or the nucleus (such as α-methyl styrene) and halogenated styrenes (such as chlorostyrenes);

(2) Aliphatic vinyl and vinylidene halides, such as vinylidene chloride and solutions of vinyl chloride in liquid monomers;

(3) Monovinyl esters of vinyl alcohol and aliphatic saturated monocarboxylic acids containing from 2 to 4 carbon atoms in the molecule, for example vinyl acetate, vinyl propionate, vinyl butyrate and vinyl chloroacetate;

(4) Derivatives of α,β-olefinically unsaturated monocarboxylic acids, especially of acrylic and substituted acrylic acids, for example nitriles (such as acrylonitrile or methacrylonitrile) and esters with an aliphatic saturated monohydric alcohol containing from 1–12 carbon atoms in the molecule, for example the methyl ester, ethyl ester, propyl ester, butyl ester, octyl ester and dodecyl ester of acrylic acid and methacrylic acid;

(5) Monoesters and diesters of α,β-olefinically unsaturated dicarboxylic acids (such as maleic and fumaric acid) with a monohydric aliphatic saturated alcohol containing from 1–12 carbon atoms in the molecule, for example, monoethyl maleate, monobutyl maleate, monocyclohexyl maleate, monododecyl maleate and dimethyl fumarate;

(6) Aliphatic conjugated diolefines containing from 4–6 carbon atoms in the molecule such as isoprene or 2-chlorobuta-1,3-diene and solutions of butadiene in liquid monomers;

(7) Unsaturated polyesters in admixture with copolymerizable monovinyl compounds as exemplified in detail below.

It is of course also possible, if the production of cross-linked polymers is desired to polymerize the aforementioned monomers in the presence of from 0.05 to 95% preferably 0.25 to 50% by weight, of other monomers containing a plurality of (preferably 2 and 3) olefinically unsaturated carbon-to-carbon double bonds. The following are mentioned as examples of such compounds: diesters of acrylic or methacrylic acid with polyhydric alcohols (such as glycol dimethylacrylate); polyallyl esters of polybasic, preferably dibasic, carboxylic acids (such as diallylphthalate); heterocyclic compounds containing three polymerizable carbon-to-carbon double bonds (such as triallyl cyanurate and triallyl-s-perhydrotriazine); and aromatic polyvinyl compounds (such as divinyl benzene or trivinyl benzene).

Other monomers which can be used are those which contain at least one vinylidene grouping or at least one polymerizable carbon-to-carbon double bond. Examples of these are halogenated hydrocarbons such as polyhalogenocyclopentadienes, mixed polyhalogenated hydrocarbons, e.g., of the trichlorofluoroethylene type and polymerizable compounds which contain phosphorus atoms such as triallyl phosphate.

The preferred monomers are: the esters of the acrylic and methacrylic series (preferably methyl methacrylate); styrene; and other monomers which are copolymerizable with the foregoing, including acrylonitrile or ethylene glycol dimethacrylate or condensates or precondensates of polyesters or phenolic, urea or melamine resins.

Oil phases comprising mixtures of polyesters and copolymerizable vinyl monomers are of considerable importance. Copolymerizable vinyl monomers are those having at least one polymerizable $CH_2=CH-$ group, preferably styrene. As unsaturated polyesters containing polymerizable double bonds, there are more especially considered those of $\alpha,\beta$-unsaturated dicarboxylic acids such as maleic and/or fumaric and/or phthalic and other acids which have been condensed with saturated di- or poly-hydric alcohols, such as ethylene glycol, diethylene glycol, triethylene glycol, propane-1, 2- and -1,3-diol, 2,2-dimethyl propanediol, 1,1,1-trimethylol propane and glycerine. The polyesters may or may not contain significant quantities of polyether linkages, such as are obtained when preparing them from acid anhydrides and alkylene oxides in the presence of certain catalysts; see for instance U.S. Pat. 3,382,217 to Leslie Case. The ratio between the polyester co-polymer components is within the usual limits in preparing co-polymers of the alkyd resin type, i.e. generally a ratio between unsaturated polyester and vinyl monomer of between 9:1 to 1:9 (by weight) is employed.

The conversion of the polyester to the salt form is of significant value in increasing the quantity of water that may be incorporated in the emulsion. In this connection, see U.S. Pat. 3,256,219, and the article by Horie et al., Journal of Applied Polymer Sciene, vol. 11, pp. 57–71 (1967), the disclosures of which are incorporated herein by reference.

The polymerizable unsaturated compounds should be contained in the oil phase, or are the oil phase, in quantities of 5 to 100% by weight, preferably 50 to 100% by weight. The remainder of the oil phase (if any) may include non-polymerizable compounds of low and high molecular weight including plasticizers, flame-proofing agents and other adjuvants. Non-limiting examples of such compounds include benzene, dibutyl phthalate, dimethyl adipate, tricresyl phosphate and organo metallic compounds which do not disturb the polymerization process. However, care should be taken to control the addition of strongly hydrophilic compounds, so that the desired water-in-oil emulsion is not interfered with.

Component W/M

In order to emulsify the water phase into the oil phase to form the desired water-in-oil emulsion, emulsifying agent(s) of the water-in-oil type is used. A wide variety of such emulsifying agents is known to those skilled in the art. For instance, hexadecyl sodium phthalate, sorbitan monooleate, sorbitan monostearate, cetyl or stearyl sodium phthalate and the like are a few. Also to be considered are high molecular weight alcohols, alkaline earth metal and aluminum soaps, fatty acid anilides, sterines, steroids, and polymers of vinyl monomers such as styrene and the esters of acrylic acid which contain terminal hydrophilic groups. Emulsifying agents having a low hydrophilelyophile balance are preferred. Exemplary emulsifiers are taught in the literature, e.g. by the Atlas HLB Surfactant Selector. Quantities ranging between about .01 and 10% by weight based on the oil phase are useful, although larger or smaller amounts may be used.

The preferred water-in-oil emulsifiers are polymeric materials and a wide variety of them has already been described in the prior art. See, for instance, U.S. Pats. 3,256,219; 3,244,772; 3,442,842 and 3,255,127; British Pats. 928,621; 962,702 and 967,223; the above-mentioned Horie et al. article; German Patent-schrift No. 965,722; and Dutch printed application No. 124,154. The disclosures of the foregoing patents and published application relative to water-in-oil emulsifiers are hereby incorporated herein by reference.

Among the most commonly used polymeric emulsifiers are those which contain, per 100 weight parts of polymer, 1.0 to 4.0 parts by weight of —OH groups, or 0.3 to 7.5 parts by weight of —$SO_3H$ groups, or 0.6 to 2.0 parts by weight of —$SO_3Na$ groups, or 1.0 to 6.0 parts by weight of =$SO_4$ groups, or 0.5 to 10.0 parts by weight of —$CONH_2$ groups, or combinations thereof.

While the water-in-oil emulsifier W/M is ordinarily a separate element of the compositions of the invention, it may be one and the same with one of the other of the components of the compositions which is able to perform the same function. For instance, the polyester resin which may be present in the oil phase may support a water-in-oil emulsion. Moreover, the pulverulent polymer P may contain incidentally or intentionally introduced functional groups which enable it to act as an emulsifier. For instance, where the polymer P is polystyrene which has been produced with a persulfate catalyst system, residual sulfonate and/or sulfate groups left in the polymer enable it to act as a water-in-oil emulsifier. Thus, the component W/M recited in the appended claims may be satisfied either by one of the other components of the composition or by a separate and distinct water-in-oil emulsifier.

The water-in-oil emulsifier must be present in sufficient amount to form a water-in-oil emulsion of sufficient stability to withstand without breaking the normal stimulae of shear, mechanical shock, temperature changes and the like which normally occur in production facilities during the preparation, pumping, agitation and shaping of the emulsions. In general, amounts between about 0.01 and about 3% and more preferably 0.05 to 1 or 2% by weight based on the component M are used. However, in the case of emulsifiers having a very low efficiency, substantially greater amounts to as high as 10% or more by weight may be required.

The suitability and efficiency of emulsifiers may be determined by simple bench tests. For instance, a valuable test for screening polymeric emulsifiers is to dissolve the water-in-oil emulsifier in that amount of the oil phase or monomer which is required to dissolve the emulsifier, and observe whether the dropwise addition of water to the solution partially separates the emulsifier from the oil phase, to produce a visually observable turbidity, at least at the phase boundary. In general, the more turbidity, the more efficient the emulsifier. When the oil phase contains a polyester which can act as an emulsifier (see DAS 1,199,982) equal weights of polyester and solvent can be used in forming the test solution. The same test is also useful in screening low molecular weight emulsifiers. In general, it has further been found that those emulsifiers which tend to be poor emulsifiers for the polymers that form in the polymerization reaction give better results. Also, it appears that better results are obtained with polymeric water-in-oil emulsifiers whose power to emulsify is degraded by the polymerization, as by the grafting of monomer molecules or chains onto the active sites (hydrophilic groups) on the backbone of the emulsifying polymer. This phenomenon has been observed when polymerizing styrene in the presence of styrene/acrylonitrile polymeric emulsifiers having residual —$SO_4$ and/or —$HSO_3$ groups. Finally, it should be observed that free-radical chain-stopping emulsifying agents—which are known to those skilled in the art—should not be used in amounts sufficient to prevent polymerization of the emulsion.

The preferred water-in-oil emulsifiers contain hydrophobic moieties (including hydrophobic portions of the polymer backbone, side chains, functional groups and the like) having a combined molecular weight of at least about 2,500 and the overall molecules of such emulsifiers contain from about 20% to about 70% by weight of hydrophilic moieties. A particularly interesting class of such polymeric emulsifying agents includes the polyalkylene glycols, such as are formed by the polymerization of alkylene oxides having two to four and preferably two or three carbon atoms. See, for instance, the polymers disclosed in U.S. Pat. 2,674,619. The most preferred polymeric emulsifiers are the polyoxypropylene-polyoxyethylene glycols which have the general formula:

which are obtained by polymerization of propylene oxide and by reaction of the resultant polypropylene glycol with ethylene oxide to form what is believed to be a block polymer. In the production of open-celled materials which are of high permeability and therefore are useful in the filter and ceramic mold fields, it is recommended that emulsifiers of the above type be used in which $m+p$ averages greater than or equal to 14 and $n$ averages greater than or equal to 43. Polymers meeting these requirements have been found to produce results far superior to other known emulsifiers.

The preferred emulsifiers described above are commercially available products sold under the trademark "Pluronic" and are normally supplied and used in non-ionic form. Certain particularly valuable members of the Pluronic series are arranged in graphic form in the accompanying chart, FIG. 1, in which the combined weight percentage of hydrophilic polyoxyethylene moieties is shown on the horizontal axis and the combined molecular weight of the hydrophobic polyoxypropylene moieties is shown on the vertical axis. The designations "P-103," "L-64" and the like are the designations adopted by the manufacturer of these materials. There is no objection to using polymeric emulsifiers of a higher molecular weight than is shown on the chart, but those falling within the area of the chart bounded by the dashed line have been found to give unusually superior results. The most preferred polyoxypropylene/polyoxyethylene glycol polymers are believed to have in their polymer chain a central portion of repeating polyoxypropylene units, which portion, at each of its ends, is joined to at least one polyoxyethylene group.

The water-in-oil emulsifiers are generally soluble in the oil phase or at least the monomers which are used. They may also be soluble in the water phase, but should at least have a preferential solubility in the oil phase. Considering the information provided herein and the great bulk of information on emulsifiers which is available in the art, those of ordinary skill in the art should without difficulty select appropriate emulsifiers for the practice of the present invention.

Component W/A

The wetting agent may be any water-soluble wetting agent(s) known in the art. They may possess some degree of solubility in the oil phase but are normally preferentially soluble in the water phase. Substantially all preferentially water soluble wetting agents are suitable, including anionic, cationic, and non-ionic, so long as the wetting agent has sufficient wetting power to wet the pulverulent polymer P and has the property of tending to appreciably destabilize water-in-oil emulsions. Wetting agents are distinct from water-in-oil emulsifiers in that the former are, of themselves, unable to sustain water-in-oil emulsions when used in conventional emulsifying quantities, and actually tend to reverse water-in-oil dispersions. For this reason, it has previously been indicated by Fisk in U.S. Pat. 2,505,353, that such materials should be excluded when attempting to prepare microporous products by polymerizable systems containing dispersed water. See Fisk, col. 6, lines 20–22. Also, as disclosed by Kropa, previous experience with such materials associated their presence with formation of latices, indicating oil-in-water emulsions. Indeed, most, if not all, of the wetting agents which are useful in the practice of the present invention, normally function as water-in-oil emulsifiers.

In accordance with the present invention, the quantity of wetting agent(s) employed is limited to less than that required to break the water-in-oil emulsion. The amount of wetting agent which will break the emulsion may be determined by a simple test. To a sample of a finished water-in-oil emulsion (lacking only the wetting agent) a highly dilute aqueous test solution of the wetting agent (about one part per thousand parts of water by weight) is added slowly with stirring until the emulsion is visually observed to break. By simple ctlculations based upon the concentration and volume of test solution used and the quantity of emulsion tested, it is possible to determine what concentration of wetting agent was present in the composition just prior to breaking. However, as indicated below, less than the maximum amount will normally suffice, and the amount of care required in transporting the emulsion to the shaping member or mold and filling the mold may be reduced somewhat when such lesser amounts are used.

Although the wetting agent is normally added as a distinct element of the compositions, one or more of the other components may contain the required amount of wetting agent in the form in which they are supplied. For instance, if the pulverulent polymers, as supplied, contain residual (even substantial) amounts of wetting agents, the presence of such residual wetting agents may suffice for purposes of the invention. However, in most cases, a predetermined amount of wetting agent will be introduced into the compositions as a distinct added element. In any event, the component W/A recited in the appended claims may be satisfied either by one of the other components of the composition or by a separate and distinct wetting agent.

A wide variety of wetting agents is commercially available, including such compounds as aryl alkyl sulfonates, alkyl sulfonates, alkyl sulfates, fatty alcohol sulfonates, fatty acid condensation products (including esters), and ethylene oxide adducts. Specific examples of anionic wetting agents include esters of sodium sulfosuccinic acid such as dioctyl sodium sulfosuccinate and sodium oleate. Specific examples of cationic wetting agents include quaternary ammonium salts such as lauryl ammonium acetate and octadecyl ammonium chloride. Specific examples of non-ionic wetting agents include isooctyl phenyl polyethoxy methanol and glyceryl monolaurate.

VARIOUS ADVANTAGES OF THE FOREGOING COMPOSITIONS

The compositions described above have the basic advantage of providing a new starting material for the known method of producing open-celled products in which the composition, preferably after a preliminary shaping step, is solidified through polymerization of the monomer(s), with or without activator(s) to a solid matrix having water-filled voids which largely intercommunicate with each other and with the surface of the matrix. The water is thereafter removed, thus providing in the matrix a system of open cells whose aggregate volume is equivalent to the quantity of liquid water which has been removed.

These compositions have the further advantage of eliminating, or at least providing a greater measure of control over, the phase transition which has heretofore occurred during the production of open celled products when employing certain of the compositions disclosed in U.S. Pat. 3,256,219; 3,244,772; 3,442,842 and the like.

Moreover, provided the above-described quantitative relationship between the water W, pulverulent solid polymer P and oil phase M is adhered to, the water content of the compositions of the invention may be adjusted to a very substantial extent merely by adding more water. This facilitates adjustment of the pore volume and permeability of the solid products made from the compositions while avoiding a problem which occurs when trying to do the same thing with compositions which rely on solid adsorbents to bind the water. See, for instance, U.S. Pat. 2,505,323, to Fisk. In such systems, in order to substantially increase the water content, one would normally use more filler. The more filler used, the poorer the physical properties of the solid product produced therefrom and the greater the resistance to the transit of fluids, particularly aqueous liquids, due to the clogging of the pores by filler and the flow resistance attributable to the attraction between aqueous liquids and the filler.

The compositions of the invention also provide a superior way of making microporous structures as compared to sintering techniques. "Sintering" as employed herein refers to carefully controlled compression and partial fusion of small particles of metal, glass, resins and the like which causes contiguous portions of the particles to adhere to one another while leaving voids between the non-contiguous portions. The sizes, numbers and degree of intercommunication between the voids generally diminish with increased pressure and fusion while, contrariwise, the strength of the resultant microporous products increases. Thus, in sintering processes, a compromise between strength and permeability is generally necessary. Thus, the production of a range of products of significantly different permeabilities but equivalent strength poses a problem. On the other hand, the compositions of the invention do not need to be compressed to impart strength to the microporous products produced therefrom, and the permeability of such products may therefore be more widely varied with much less drastic effects on their strength properties. Moreover, because of the elimination of the need for compression, the compositions of the invention can be converted to microporous materials with a lower capital investment than is required for sintering processes.

The compositions of the invention lend themselves well to storage or marketing as two part systems having extended shelf life (e.g. six months or more). For instance, a first part may include the polymer P, aqueous phase W and wetting agent W/A, and a second part (packaged and stored in a separate container) may include the oil phase M and water-in-oil emulsifier W/M. The first part may settle during storage, but proper dispersion may be restored by agitation prior to use. To make an emulsion, the two parts of the system may be vigorously agitated in predetermined proportions.

VARIOUS ADVANTAGES OF PRODUCTS MADE FROM THE FOREGOING COMPOSITIONS

The products prepared by solidifying the above-described products through polymerization or curing are valuable in that they are obtainable in forms having widely varying properties, ranging from products of relatively low pore volume, low permeability and high strength to those of much higher pore volume and permeability and lower strength. Surprisingly, however, an unusually high degree of strength may be maintained as pore volume and permeability are adjusted upwardly. Moreover, it is possible to use the compositions of the present invention to produce products which, at a given low pore volume, have a surprisingly high permeability.

The products may also have one or more of the following additional advantages: low shrinkage, which may be reduced to about 0.3%; easy and rapid elimination of the water used to form the pores; excellent reproduction of contoured surfaces; and the ability to withstand machining, sawing, nailing and the like. The compositions lend themselves well to shaping in open molds, or by centrifugal or pressure casting. This opens an extremely wide field of application to the solid compositions and shaped articles.

The adjustable and excellent permeability to gases and liquids which is available offers many advantages. For example, it is possible to vacuum form a film onto the finished shaped articles. By first spraying an adhesive composition onto the shaped article, a tight, durable surface can be obtained. Such a vacuum forming operation without prior use of adhesive may also be used to manufacture casting dies from thick polyethylene or polypropylene film in a single step.

The porosity of the products facilitates post-impregnation with fire retarding agents. On the other hand, fire retardants may be added to the casting compositions themselves. Since water is normally absorbed immediately by the products, burning material can be readily extinguished with water. Once the material has absorbed the water, it is no longer inflammable.

Among other things, the solidified products are also useful in flooring; paving; drainage systems and parts thereof; structural parts and members such as prefabricated walls and planking; molds for concrete casting; vases for plants; as wood substitutes; e.g. for furniture or furniture parts, especially garden furniture; for decoration and advertising articles; parts of light fittings; toys; molded parts for automobile construction; casings for machines; ice chests and parts of refrigerator cabinets and refrigerating units; dies for casting textile fibers, paper pulp, wood pulp, paper board, ceramics, clay and porcelain; packaging material; as the resinous portion of glass, asbestos and rock wool fiber preforms; filters for liquids and gases; shaped parts used to introduce gases into liquids; parts of pneumatic conveying systems; and air permeable shells and splints for surgical and orthopedic purposes.

The advantages of the solidified products produced in accordance with the invention may be illustrated in part by reference to their use in dies for casting ceramic objects such as plates, bowls, sinks, bathtubs and the like from aqueous casting mixes. Because the products of the invention have pores which are free from solid adsorbents, they exhibit a rapid rate of passage of fluids, both gaseous and liquid, including water. Thus, as compared with the usual plaster molds, the dies made from these new materials facilitate much more rapid and complete removal of water from the ceramic objects before removal from the die.

Thus the solidified products are useful in all kinds of ceramic casting procedures including:

(1) Injection molding under fluid pressure exerted on a pumpable casting mix in a closed mold made of the open cell material, which resists passage of the solids therethrough, with or without the use of vacuum withdrawal of the water;

(2) Shaping with the hands or with mechanized shaping means on a stationary or moving, i.e. rotating, die which is made of the open cell material, a vacuum being applied through the die to hold the work in place;

(3) Mechanical compression on a mold of open cell material while the water in the mix is filtered through the mold with or without the assistance of a vacuum; and (4) Any combination of the foregoing.

At the conclusion of any forming operation conducted in the above manner it is possible, with shaped articles of an appropriate size to blow them off of the mold by passing a gaseous fluid through the back or side of the die and through the body thereof to the forming surface.

A comparison of ceramic molding processes employing dies formed of the highly permeable products of the present invention, as opposed to those employing the conventional gypsum plaster molds, indicates that the number of molds required and the capital investment in drying ovens may be drastically reduced. Also the number and duration of the various steps involved in the casting and drying operations is very significantly diminished.

Figure 2:
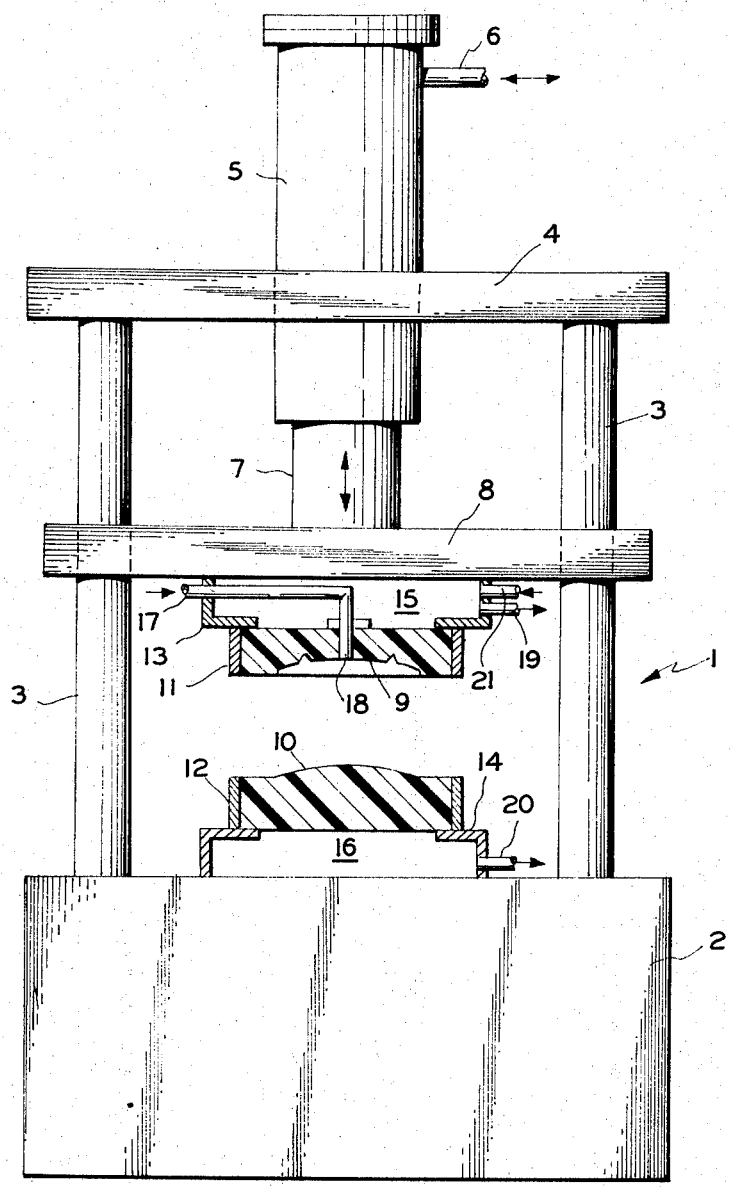

The foregoing has been demonstrated on a pilot scale employing apparatus similar to that disclosed in FIG. 2. In the drawing, there is disclosed a press 1 having a base 2 in which are secured a plurality of upwardly extending posts 3, atop which a head plate 4 is mounted. Extending vertically through head plate 4 is a hydraulic or pneumatic cylinder 5 having a supply pipe 6 for operating fluid and a longitudinally extensible ram 7 which raises and lowers a horizontal moveable platen 8.

Secured in registry with one another on platen 8 and base 2 are, respectively, concave upper and convex lower circular forming dies 9 and 10 of rigid solidified plastic materials produced in accordance with the invention, having an average pore size of less than about 50μ, a resistance to compression of at least about 50 kp./cm.$^2$ and more preferably more than about 100 kp./cm.$^2$ to about 300 kp./cm.$^2$ and more, and capable of withstanding injection pressures of from 10 to 50 and more kgs./cm.$^2$. Surrounding the dies are close-fitting air tight circumferential bands 11 and 12. The aforesaid dies and bands are securely fastened to housings 13 and 14 which enclose air-tight chambers 15 and 16 respectively. Through one wall of chamber 15 extends a supply pipe 17 for transmitting a pumpable aqueous ceramic casting mix to a sprue 18 communicating with the interior of the die 9. Passing through the opposite side walls of chambers 15 and 16 respectively are water withdrawal pipes 19 and 20, which are connected to a vacuum pump (not shown). Also communicating with chamber 15 is a pressure pipe 21 connected to a source (not shown) of a gaseous fluid under pressure.

The flows in hydraulic or pneumatic cylinder supply pipe 6, casting mix supply pipe 17, water pipes 19 and 20 and pressure pipe 21 may be controlled by an automatic press cycle control system (not shown) such as that commonly used in the injection molding art for closing the press, filling the die, sucking water out of the object through the dies, opening the press and ejecting the shaped article, which in this case is a dinner plate. One press, if desired, may be provided with multiple die sets or with a single die set (upper and lower) capable of forming a plurality of articles in a single press cycle.

Based upon the foregoing pilot plant experience, the possible improvements and reductions in the numbers of steps and the duration of steps in ceramic casting processes using the dies of the invention, as compared with what is understood to be the usual practice with gypsum plaster dies, are as follows:

Preparation of the mold itself, reduced from two hours (to mold and dry) to 30–45 minutes (to mold and cure);

Molding a ceramic article and extracting water therefrom, reduced from 25–60 minutes to about one minute;

Preliminary drying of the molded objects on the mold, reduced from 25–30 minutes to none;

Removal of the object from the mold, converted from a manual to an automatic or semi-automatic operation;

Final drying of the object, reduced from about 30 minutes to about 10 minutes;

Drying of the mold between molding cycles reduced from about 30 minutes to none;

Shrinkage of the molded object during firing, reduced from approximately 17% to about 14%, and Mold life, increased from about 60–100 cycles to as high as 5000–6000 cycles, or more.

SUGGESTIONS FOR PREPARING AND SOLIDIFYING THE COMPOSITIONS

Recommended blending techniques and composition criteria will now be set forth in relation to the preferred materials and order of mixing, it being understood that these techniques and criteria may readily be varied by those skilled in the art according to well-known principles of swelling time, solubility, viscosity, agitation, and the like to adapt them to other materials. However, the quantitative relationships given herein for the water W, pulverulent polymer P and oil phase M have been found critical, and it should therefore be understood that the invention should be practised within the bounds of these limitations unless a substitute material of equivalent effect be substituted for one of the recited materials.

Depending on whether a low or high percentage of pore volume is desired, one will select a low or high percentage of water within the range of 20 to 60%. Preferably at least about 21%, more preferably about 23% and still more preferably about 25% of water is used if final products useful as filters are desired. There is some reduction of strength properties as the water content goes much above 50%, so if maximum strength is desired, about 50% is the preferred upper limit for the water.

The quantity of pulverulent polymer P is kept in proper relation to the other ingredients by the above-mentioned formula. When operating with a very high proportion of water, which tends to increase the viscosity of the composition, diminished quantities of polymer are desirable and the use of more oil phase then polymer is desirable. Thus, for instance, when operating with 60 parts water, a 4:3 weight ratio of monomer to polymer is preferred. When preparing filters and molds, such as the ceramic casting molds discussed above, it is strongly recommended that the proportion of W, P and M be chose to satisfy the above formula wherein the value of $x$ is 5. In this manner, the products of higher permeability are normally obtained.

The quantity of M, oil phase, is also kept in proper relation to the other ingredients by the above-mentioned formula. The calculation basis for the parts by weight of oil phase M (and also the components W and P) is the total weight of W, P and M. The weight of the water-in-oil emulsifier W/M and wetting agent W/A are normally excluded from said basis. But when the water-in-oil emulsifier and polymer P are one and the same material, the water-in-oil emulsifier becomes part of the weight basis through inclusion in the weight allowance for polymer P.

When employing the preferred materials, no special type or intensity of agitation is required. Small batches have been readily prepared by manual stirring with a small paddle. However, with materials which are difficult to emulsify, including especially polyesters in which the molecular weight is very high and/or the acid components are predominantly aromatic, vigorous agitation in mixers capable of developing shear high may be necessary.

When using a two part system employing the preferred materials (part 1 including the components W, P and W/A, and part 2 the M and W/M components) part 1 is agitated thoroughly before use to insure uniform distribution of P. Then parts 1 and 2 are quickly and thoroughly mixed to form a water-in-oil emulsion. An illustrative initial viscosity for such an emulsion at 15° C. is about 150–250 cp., but during mixing with somewhat higher temperatures, e.g., 25° C., the viscosity may, for example, reach 500–1500 cp., depending on the ingredients used. It has been found desireable to use mixtures which at 20° C. remain liquid for about 5 minutes after initial mixing of parts 1 and 2 and then gradually undergo an increase in viscosity of about 15,000 to 30,000 cp. in about 8 to 20 minutes after said initial mixing. Of course these times may be varied to suit the circumstances of the particular production procedure to which the compositions are being applied.

Before, during or subsequent to the bringing together of the components W, P, M, W/M and W/A, a suitable activator system is added to one or more of them. The activator system is not part of the invention disclosed herein, and those skilled in the art are acquainted with and have the requisite skill to select many which are suitable. Thus, by way of example only, it is contemplated that both monomer-soluble and water-soluble free-radical forming compounds or redox systems suitable for polymerization purposes may be included, although monomer-soluble activators are preferred. Activator compounds, which have already been disclosed as having usefulness in polymerizing W/O emulsions include: free-radical forming nitrogen compounds, such as azodiisobutyric acid dinitrile; peroxides, especially acyl peroxides (such as lauroyl peroxide and benzoyl peroxide); alkyl—as well as dialkyl—peroxides (such as tertiary butyl hydroperoxide, cumene hydroperoxide, p-menthane hydroperoxide, and ditertiary butyl hydroperoxide), ketone peroxides (such as methyl ethyl ketone peroxide and cyclohexanone peroxide); percarbonates; mixtures of peroxides with amines (such as dimethyl-p-toluidine diethanolamine or triethylene tetramine); metal compounds such as cobalt naphthenate. It has been suggested that peroxides whose half-life period below 100° C. is less than 10 hours are of preferred interest as activators. With activators including aliphatic (e.g., lauroyl) or aromatic (e.g., benzoyl) organic acid peroxides, and tertiary amine such as dimethyl-p-toluidine or dimethylaniline, the compositions may be cured in 5 to 50 or more preferably 8 to 10 minutes at a temperature below 18° C. With appropriate activators, higher temperature may be used. However, suitable precautions should then be taken to substantially prevent premature evaporation or loss of water, e.g., as by putting the compositions under pressure, until the mass has cured or solidified to the extent necessary to prevent enlargement of the pores beyond the desired size. With some activators, it may be necessary to conduct the polymerization in a substantially oxygen free environment, but normally the polymerization is conducted under atomspheric pressure in the presence of air.

The swelling rate of a given polymer may be altered if desired by altering the extent of its subdivision, diminishing particle size being generally related to an increase in swelling rate. The mean pore size of the polymerized product may also be varied by changes in the mean particle size of P, since the open cells in the products of the invention appear to form in the voids between adjacent particles of P, and the sizes of the voids appear to have some effect on the sizes of the cells. Mean particle sizes for P in the range of about 20 to about 300 microns are contemplated. However, although one may confine the particle size to this range, it is by no means necessary, since it is also possible to work with mixtures of polymer powders which contain particles both within and without the foregoing range. Thus, when the above-mentioned range is set forth herein, it is to be understood as referring to particle mixtures which contain substantial or even major proportions of particles within the recited range and which may or may not contain substantial proportions of particles outside the recited range. The voids between swollen or dissolved particles of polymer P in the finished products contain to a varying extent the residues of the walls of cells formed by polymerization of the monomer M, so that where the particles and therefore the voids are relatively large, the quantity of cell residues in the voids is also greater, and the tendency towards undue enlargement of the pore size is thus counteracted. Best results, however, have been obtained with polymers having a particle size (by weight percentage) follows:

|  | Microns |
|---|---|
| 5% | 80–120 |
| 80% | 50–80 |
| Balance | 20–50 |

When incorporating varying kinds and quantities of polymers P in the compositions, variations in the amount of swelling generated thereby may be offset by conversely increasing or decreasing the qauntity and efficiency of the wetting agent W/A. Wetting agents in general lower the surface tension of water, and in the compositions of the invention they cooperate with the swelling polymer P in opening the aqueous phase. A test has been given herein above from which to determine the maximum of W/A to be used in the compositions of the invention. In principle, a more efficient wetting agent and/or a larger amount, including said maximum, may be used to offset decreases in the amount and/or swellability of the polymer P. Of course, when working with the maximum amount, it may be necessary to exercise considerable care in the handling of the emulsion while it is being prepared, stored, transported and shaped. Thus, it has been found helpful for the sake of convenience to use about 90% or less of the maximum. In most cases, it is possible to achieve the objectives of the invention with about 50% or less of the maximum amount. This makes it possible to provide a generous reserve of initial stability in the emulsions and still produce a solidified product with a well-opened cell structure.

On the other hand, it is also possible to compensate for the presence of more readily swellable polymers P, and/or large amounts thereof. This may be done by reducing the efficiency of W/A and/or the quantity thereof. In principle, the amount may be reduced to the minimum amount which will appreciably enhance the openness of the cell structure of the solidified product. As standard tests already exist for testing the wetting power of wetting agents, and the threshhold quantity of W/A for use in the invention can readily be determined by comparing the amounts of water which can be removed from solidified products made with varying quantities of W/A, this presents no difficulty for the man skilled in the art. In the majority of cases, more than about 1% of the maximum amount of W/A will be used, and in still more instances, more than 10% of the maximum will be used.

It should be understood that polymers P of widely varying swelling rate can also be readily accommodated by a judicious selection of activator. With rapidly swelling or dissolving polymers P, faster acting activators may be employed. With solid pulverulent polymers P which swell more slowly, slower acting activators are appropriate. When component P is supplied to the mixture is suspension in the water W, it solvates more gradually than if it is mixed together with all the components or initially suspended in the solvent. Moreover, solvation of the powdered polymer may be retarded by the presence of other materials which are soluble in or attract the monomer, such as polyester resins or precondensates. Thus, it will be seen that ample ways exist to apply a wide variety of polymers having different swelling and solubility characteristics of the invention.

When solid polyesters or polyester precondensates are initially present in the composition as part of component P, it is desirable that their swelling rate be matched to that of the other polymers in component P or that the swelling rate is at least balanced therewith to provide the swelling characteristics previously explained in connection with polymer P. On the other hand, if polyesters are introduced in a dissolved state in the monomer(s), such as in styrene or methyl methacrylate or mixtures thereof, up to approximately 35–40% or even 50–55% of the polyesters (based on polyester plus monomer) may be accommodated, before a rapid decrease in permeability is noted.

While still in the liquid or semi-liquid state, the compositions are applied to a shaping member or other object by dipping, spraying, pouring, pumping, spreading or any other suitable mode of application. They may be reinforced if desired, such as by use of textile (including glass) fibers, whether randomly distributed or in the form of woven, non-woven or knitted fabrics. Prewetting of the fibers with component M followed by squeezing out the excess is desirable, and when the compositions are cast in molds, smooth-surfaced molds appear to give the best permeability.

Under proper conditions, up to 75% of the water may be removed from the products by vacuum treatment in a matter of seconds following completion of the cure. As the polymerization rate of water-in-oil emulsions usually steeply rises and then levels off, dewatering is favorably conducted several hours after polymerization. Again, under optimum conditions, the remainder of the water passes off in about 24 hours at atmospheric pressure and 25° C. With products which dry less readily, extended pressure or vacuum and/or heat treatment may be used to remove the water.

PERMEABILITY TEST

A circular test sample of 10 mm. thickness and 8 cm. diameter is cast in a silicone rubber mold. After curing the sample is placed in a suction funnel on a rubber ring having an inside diameter of 6.7 cm. which effectively reduces the open surface on the bottom of this sample to an area 6.7 cm. in diameter. 150 ml. of water, which can pass through the funnel only by passing through the sample, are placed in the funnel above the sample and a vacuum of 14 mm. Hg is applied from beneath. The permeability value, as defined herein, is the number of seconds it takes the water to pass through the sample under the aforesaid vacuum. In the examples below, those samples which allowed less than 10 ml. of water to pass through in 180 seconds are designated by the symbol $t$, signifying a tight cellular structure of low permeability.

By way of illustration and not limitation, a number of examples are given hereinafter, in which all parts are by weight unless the contrary is indicated. The polystyrene mentioned under component W/M as a water-in-oil emulsifier is an emulsion polymer which has been produced in the presence of persulfates and, therefore, contains sulfonic acid or sulfonate groups.

Examples 1 to 5 in the table indicate that the permeability increases as the polymer content increases.

Examples 6 to 10 illustrate that impermeable products are formed if the conditions according to the invention are not observed (Example 6 was carried out without the addition of a wetting agent; Examples 7 to 9 were performed without the addition of a wetting agent and a polymer; and Example 10 with the addition of only 20 percent of water).

In Examples 11 to 14, the amount of water added has been increased from 25 percent to 50 percent.

Examples 15 to 18 have been carried out with different polymers and monomers which also give still satisfactory permeability to water.

After curing, the water is removed from the finished products. Except for the tight samples, from 45 to 73 percent of the emulsion water can be sucked off by means of a water jet pump from all of the remaining samples within a few seconds.

| Example number | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Component W: | | | | | | | | | | | | | | | | | | |
| Water, parts by weight | 75 | 75 | 75 | 50 | 50 | 50 | 50 | 100 | 200 | 60 | 75 | 85 | 100 | 200 | 50 | 100 | 100 | 100 |
| Percent | | | | | 33 | 33 | 33 | 50 | 66 | 20 | 25 | 28 | 33 | 50 | 33 | 50 | 33 | 33 |
| Component W/A: | | | | | | | | | | | | | | | | | | |
| (1) Commercial wetting agent | 0.02 | 0.02 | 0.02 | 0.01 | | | | | | 0.02 | | 0.02 | 0.03 | | 0.02 | 0.02 | 0.02 | |
| (2) Commercial wetting agent | | | | | 0.02 | | | | | | 0.02 | | | 0.03 | | | | 0.02 |
| Component P: | | | | | | | | | | | | | | | | | | |
| Pulverulent polymer— | | | | | | | | | | | | | | | | | | |
| (1) Polymethyl-methacrylate | 10 | 20 | 50 | 50 | 55 | 50 | | | | 60 | 75 | 85 | 100 | 100 | | | | 50 |
| (2) Copolymer of styrene and unsaturated polyester | | | | | | | | | | | | | | | | 50 | | 50 |
| (3) Copolymer of methylmethacrylate and butylacrylate | | | | | | | | | | | | | | | | | 50 | |
| (4) Mixture of PVC powder and polymethylacrylate 2:1 | | | | | | | | | | | | | | | | | 100 | |
| Component M: | | | | | | | | | | | | | | | | | | |
| Polymerizable liquid— | | | | | | | | | | | | | | | | | | |
| (1) MMA | 50 | 50 | 50 | 40 | 45 | 50 | | | | 120 | 100 | 85 | 100 | 85 | 30 | 30 | | 100 |
| (2) Styrene | 13 | 13 | | 8 | | | 40 | 40 | 40 | 30 | 20 | 15 | | 5 | 10 | | 30 | |
| (3) Diallyl phthalate | | | | | | | | | | | | | | | | 20 | 30 | |
| (4) Unsaturated polyester | 27 | 18 | | 12 | | | 60 | 60 | 60 | 30 | 30 | 30 | | 10 | 10 | | 30 | |
| Component W/M: | | | | | | | | | | | | | | | | | | |
| Water-in-oil emulsifier— | | | | | | | | | | | | | | | | | | |
| (1) Polystyrene EF (trade name) | | | | | | 0.4 | | | | | | | | | | | | 0.8 |
| (2) Polyethylene/polypropylene glycol (40% hydrophilic groups) | 1.0 | 1.0 | 1.0 | 0.5 | | 0.5 | 0.4 | 0.4 | 0.4 | 0.8 | 0.8 | 0.8 | 0.8 | 0.8 | 0.4 | | | |
| (3) Commercial water-in-oil emulsifier | | | | | | | | | | | | | | | | 0.4 | 0.6 | |
| Catalysts and accelerators: | | | | | | | | | | | | | | | | | | |
| (1) 50% benzoyl peroxide | | | 0.6 | 0.6 | 0.5 | 0.5 | | | | | 1.5 | 1.5 | 1.2 | 1.2 | 0.6 | 1.5 | 1.5 | 1.5 |
| (2) Lauroyl peroxide | 1.2 | 1.2 | | | | | 1.5 | 1.5 | 1.5 | 1.5 | | | | | | | | |
| (3) 50% tertiary amine-dimethyl-p-toluidine | 0.5 | 0.5 | 0.3 | 0.3 | 0.3 | 0.3 | 0.2 | 0.2 | 0.2 | 0.4 | 0.4 | 0.3 | 0.4 | 0.4 | 0.2 | 0.5 | 0.5 | 0.4 |
| Emulsion temp. (° C.) | 16 | 16 | 17 | 20 | 18 | 18 | 20 | 20 | 20 | 16 | 16 | 18 | 18 | 18 | 20 | 25 | 20 | 20 |
| Curing time (min.) | 18 | 18 | 15 | 14 | 15 | 15 | 15 | 30 | 50 | 58 | 50 | 30 | 50 | 20 | 20 | 20 | 20 | 20 |
| Time for water to pass through (sec.) | 27 | 2 | 1.5 | 1 | 8 | T | T | T | T | T | 10 | 5 | 2 | 2 | 10 | 15 | 15 | 18 |

NOTES:
Component W/A:
  1. 50% water solution of "Pril," Producer: Henkel, Dusseldorf Germany.
  2. 20% water solution of "Rei," Producer: Maurer, Boppart/Thein, Germany.
Component P:
  1. Suspension polymer of 95% methyl methacrylate, 5% ethyl acrylate, average particle size about 10 to 20µ, molecular weight about 750,000.
  2. Suspension polymer of 50% unsaturated polyester, "Palatal 405," Producer: BASF, and 50% styrene, average particle size about 20 to 30µ, molecular weight about 400,000.
  3. Suspension polymer of 85% methyl methacrylate and 15% butyl acrylate, average particle size 20 to 30µ, molecular weight about 400,000.
  4. 1:1 mixture of polymer 1, above, and "Lucovyl" PVC powder, Producer: Pechinee, St. Gobain.
Component M:
  1. MMA.=methyl methacrylate.
  4. Unsaturated polyester: Examples 1-5, "Palatal A 410," Producer—BASF; Examples 7-18, "Palatal P 6," Producer—BASF.
Component W/M:
  3. 1:1 mixture of "Span 85" and "Renex 36," Producer—Atlax Powder Co.
Catalyst:
  2. "Alperox C," Producer—Wallace and Tiernan.

In Examples 19 through 30, various wetting agents and water-in-oil emulsifiers are used, which are cited in the following lists. Examples 19 through 30 are carried out under the same conditions as those given above for Examples 1 through 19.

As component d (wetting agent):

No.
(1) Alkylphenylpolyglycolether.
(2) Triethanolamine-tetrapropylene-benzenesulfonate.
(3) Fatty acid condensation product sold by Farbwerke Höchst under tradamark "Hostapon."
(4) Commercially available wetting agent composed of higher molecular weight alkylsulfate, alkylbenzene sulfate and electrolyte.
(5) Commercially available wetting agent, combination of fatty alcohol sulfonate, long chain alkylaryl sulfonate, such as sodium para dodecyl benzene sulfonate, alkylene benzoyl polyglycol ether, alkylsulfonate.

As component e (water-in-oil emulsifier):

No.
(1) Plureonic 103.
(2) Pluronic 104.
(3) Pluronic 105.
(4) Pluronic 123.
(5) Polystyrene EF, sulfur content 0.15%, $k$-factor 115, a polymeric product produced by emulsion polymerization in the presence of potassium persulfate.
(6) A copolymer prepared by polymerization of 9 parts by weight of methylmethacrylate and 1 part by weight of vinyl sulfonic acid and which contains 7.5% by weight of —$SO_3H$ groups.
(7) A copolymer containing methylmethacrylate and octyl-methacrylate in proportions of 80:20, K value=75.0 at 50% solids in aqueous dispersion, which has been prepared by emulsion polymerization in the presence of potassium persulfate.

All samples produced exhibited a good to very good permeability. The shrinkage was linear between 0.3 and 0.6%. The mechanical properties of the samples prepared in accordance with the examples were for compression strength a minimum of 100 kp./cm.$^2$ and tensile strength a minimum of 100 kp./cm.$^2$. These values for compression and tensile strength are in general substantially exceeded, in particular, if a minor quantity of unsaturated polyester is included in the pulverulent polymer and the water content of the emulsion is less than 33%.

of water at 18° C. with a suction of 14 torr (gauge). The results were as follows:

| Example number | 31 | 32 | 33 | 34 |
|---|---|---|---|---|
| Pore volume, percent | 25 | 33 | 40 | 50 |
| Pressure strength, kp./cm.$^2$ | 383 | 310 | 200 | 100 |
| Tensile strength, kp./cm.$^2$ | 195 | 165 | 100 | 68 |
| Flexural strength, kp./cm.$^2$ | 270 | 270 | 210 | 130 |
| Heat distortion temp., ° C. | 120 | 108 | 103 | 90 |
| Permeability (seconds—filtration time) | 8–9 | 1–3 | 1–2 | 0.5–0.7 |

From the foregoing, it may be conceded that, all other things being equal, an increase in the pore volume in the range of 25% to 33% pore volume reduces the strength and increases the filtration speed. In the range of about 33 to 50%, and especially from about 33 to about 40% pore volume, further increases in pore volume are accompanied by further reductions in strength and heat distortion temperature, but only slight changes in filtration time occur. In view of the foregoing, it may be seen that materials with pore volumes of about 25 to about 40% and especially about 33% exhibit both low resistance to flow and high strength, thus making them of special interest for the formation of larger filter elements.

What is claimed is:

1. A water-in-oil emulsion containing:
   (a) from 20 to 60 parts by weight of water, the number of parts of water in said emulsion being referred to hereinafter as $w$;
   (b)
   $$\frac{100-w}{10} \text{ to } \frac{100-w}{1.8}$$
   parts by weight of water-insoluble pulverulent polymer, copolymer or mixture thereof which is at least swellable in (c) below, the number of parts of said polymer, copolymer or mixture in said emulsion being referred to hereinafter as $p$;
   (c) $100-(w+p)$ parts by weight of at least one ethylenically unsaturated liquid monomer which is polymerizable in said emulsion to a solidified form;
   (d) water-in-oil emulsifier(s) in an amount sufficient to prevent breaking of said emulsion during polymerization of said monomer(s); and
   (e) water soluble wetting agent(s) in an amount sufficient to bring adjacent water droplets in said emulsion together but insufficient to break the emulsion.

2. A water-in-oil emulsion in accordance with claim 1 which includes a homo- or co-polymer of methyl methacrylate as component (b).

3. A water-in-oil emulsion in accordance with claim 1

| Example number | 19 | 20 | 21 | 22 | 23 | 24 | 25 | 26 | 27 | 28 | 29 | 30 |
|---|---|---|---|---|---|---|---|---|---|---|---|---|
| 1. Water | 50 | 50 | 50 | 50 | 50 | 50 | 50 | 50 | 50 | 50 | 50 | 50 |
| 2. {Wetting agent number | 1 | 2 | 3 | 4 | 5 | 4 | 4 | 4 | 4 | 4 | 4 | 4 |
| {Amount | 0.1 | 0.05 | 0.08 | 0.05 | 0.2 | 0.05 | 0.05 | 0.05 | 0.05 | 0.05 | 0.05 | 0.05 |
| 3. Polymethylmethacrylate | 50 | 50 | 50 | 50 | 50 | 50 | 50 | 50 | 50 | 50 | 50 | 50 |
| 4. Unsaturated polyester, 66% in styrene | 15 | 15 | 15 | 15 | 15 | 15 | 15 | 15 | 15 | 15 | 15 | 15 |
| 5. Methylmethacrylate | 35 | 35 | 35 | 35 | 35 | 35 | 35 | 35 | 35 | 35 | 35 | 35 |
| 6. {Water-in-oil emulsifier number | 3 | 3 | 3 | 3 | 3 | 1 | 2 | 3 | 4 | 5 | 6 | 7 |
| {Amount | 1.0 | 1.0 | 1.0 | 1.0 | 1.0 | 1.0 | 1.0 | 1.0 | 1.0 | 1.0 | 1.0 | 1.0 |
| 7. Catalyst: benzoyl peroxide (50%) | 1.8 | 1.8 | 1.8 | 1.8 | 1.8 | 1.8 | 1.8 | 1.8 | 1.8 | 1.8 | 1.8 | 1.8 |
| 8. Accelerator: dimethyl-para-toluidine | 0.25 | 0.25 | 0.25 | 0.25 | 0.25 | 2.25 | 0.25 | 0.25 | 0.25 | 0.25 | 0.25 | 0.25 |
| 9. Curing time (min.) | 15 | 15 | 15 | 15 | 15 | 15 | 15 | 15 | 15 | 15 | 15 | 15 |
| 10. Time for water to run through (sec.) | 12 | 17 | 12 | 2 | 8 | 2 | 3 | 6 | 2.5 | 2 | 6 | 10 |

In Examples 31 to 34, the relationship between the pore volume, strength and heat distortion properties of the materials produced in accordance with the invention were ascertained. Water-in-oil emulsions containing 25, 33, 40 and 50% of water, respectively, were polymerized in sets of rods 0.8 cm. in diameter (for strength tests), 10 mm. thick bars (for heat distortion test) and 37 cm.$^2$ plates (for permeability tests). The heat distortion bars were tempered for at least three hours prior to testing. The permeability was measured with 150 cm.$^3$ wherein said component (b) is present in an amount in the range of from $$\frac{100-w}{5} \text{ to } \frac{100-w}{1.8}$$

parts by weight.

4. A water-in-oil emulsion in accordance with claim 1 which includes methyl methacrylate as component (c).

5. A water-in-oil emulsion in accordance with claim 1 which includes styrene as component (c).

6. A water-in-oil emulsion in accordance with claim 1 in which unsaturated polyester is present in component (c).

7. A water-in-oil emulsion in accordance with claim 1 wherein polymer having the general formula $$HO(C_2H_4O)_x(C_3H_6O)_y(C_2H_4O)_zH$$

in which $x$, $y$ and $z$ are integers, the hydrophobic moiety has a molecular weight of at least 2,500 and the total molecule contains from 20 to 70 percent of hydrophilic groups, is present as component (d).

8. A water-in-oil emulsion in accordance with claim 1 which contains colorant.

9. A water-in-oil emulsion in accordance with claim 1 which includes fibers.

10. A method of producing solid materials having open cells therein which comprises an emulsion in accordance with claim 1 and, after the polymeric component (b) in said emulsion has become at least swollen in the polymerizable component (c), solidifying said emulsion by polymerizing component (c).

11. A method in accordance with claim 10 in which a homo- or co-polymer of methlyl methacrylate is employed as component (b).

12. A method in accordance with claim 10 in which said component (b) is employed in an amount in the range of from $$\frac{100-w}{5} \text{ to } \frac{100-w}{1.8}$$

parts by weight.

13. A method in accordance with claim 10 in which methyl methacrylate is employed as component (c).

14. A method in accordance with claim 10 in which styrene is employed as component (c).

15. A method in accordance with claim 10 in which unsaturated polyester is present in component (c).

16. A method in accordance with claim 10 wherein polymer having the general formula $$HO(C_2H_4O)_x(C_3H_6O)_y(C_2H_4O)_zH$$

in which $x$, $y$ and $z$ are integers, the hydrophobic moiety has a molecular weight of at least 2,500 and the total molecule contains from 20 to 70 percent of hydrophilic groups, is employed as component (d).

17. A method in accordance with claim 10 in which colorant is present in said emulsion.

18. A method on accordance with claim 10 in which the emulsion includes fibers.

19. A method in accordance with claim 10 wherein said emulsion is solidified before said polymeric component (b) dissolves in said polymerizable component (c).

20. A method of producing from an emulsion, porous solid articles which readily dehydrate, said method comprising:
(i) forming a first mixture which contains:
  (a) 20 to 60 parts by weight of water, the number of parts of water is said emulsion being referred to hereinafter as $w$, and
  (b)

$$\frac{100-w}{10} \text{ to } \frac{100-w}{1.2}$$

parts by weight of water-insoluble pulverulent polymer, copolymer or mixture thereof which is at least swellable in (c) below, the number of parts of said polymer, copolymer or mixture thereof in said emulsion being referred to hereinafter as $p$;

(ii) forming said emulsion of said first mixture and:
  (c) $100-(w+p)$ parts by weight of at least one ethylenically unsaturated liquid monomer which is polymerizable in said emulsion to a solidified form,
  (d) water-in-oil emulsifier(s) in an amount sufficient to prevent breaking of said emulsion during polymerization of said monomer(s), and
  (e) water soluble wetting agent(s) in an amount sufficient to bring adjacent water droplets in said emplsion together but insufficient to break the emulsion; and (iii) polymerizing component (c) after component (b) has become swollen by component (c).

21. A method in accordance with claim 20 in which a homo- or co-polymer of methyl methacrylate is employed as component (b).

22. A method in accordance with claim 20 wherein said component (b) is present in an amount in the range of from $$\frac{100-w}{5} \text{ to } \frac{100-w}{1.8}$$

parts by weight.

23. A method in accordance with claim 20 in which methyl methacrylate is employed as component (c).

24. A method in accordance with claim 20 in which styrene is employed as component (c).

25. A method in accordance with claim 20 in which unsaturated polyester is present in component (c).

26. A method in accordance with claim 20 wherein polymer having the general formula $$HO(C_2H_4O)_x(C_3H_6O)_y(C_2H_4O)_zH$$

in which $x$, $y$ and $z$ are integers, the hydrophobic moiety has a molecular weight of at least 2,500 and the total molecule contains from 20 to 70 percent of hydrophilic groups, is employed as component (d).

27. A method in accordance with claim 20 in which colorant is present in the emulsion.

28. A method in accordance with claim 20 in which the emulsion includes fibers.

29. A method in accordance with claim 20 wherein said emulsion is solidified before said polymeric component (b) dissolves in said polymerizable component (c).

References Cited
UNITED STATES PATENTS

| | | | |
|---|---|---|---|
| 3,256,219 | 6/1966 | Will | 260—2.5 R |
| 2,674,619 | 4/1954 | Lundsted | 260—31.4 |

WILBERT J. BRIGGS, Sr., Primary Examiner

U.S. Cl. X.R.

260—2.5 M, 2.5 N, 2.5 HB, 29.6 RB, 29.6 WQ, 861, 862, 872, 873, 879, 881, 884, 885, 886